(12) United States Patent
James et al.

(10) Patent No.: US 7,580,829 B2
(45) Date of Patent: Aug. 25, 2009

(54) APPARATUS AND METHOD FOR REORDERING OF MULTIPLE LANGUAGE DATABASES FOR TEXT DISAMBIGUATION

(75) Inventors: Christina James, Seattle, WA (US); Mark Brighton, Seattle, WA (US); Lisa Nathan, Seattle, WA (US); Ethan Bradford, Seattle, WA (US); David Kay, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 894 days.

(21) Appl. No.: 11/056,733

(22) Filed: Feb. 11, 2005

(65) Prior Publication Data

US 2005/0198023 A1    Sep. 8, 2005

Related U.S. Application Data

(63) Continuation of application No. 10/621,864, filed on Jul. 16, 2003.

(60) Provisional application No. 60/397,253, filed on Jul. 18, 2002.

(51) Int. Cl.
*G06F 17/20* (2006.01)

(52) U.S. Cl. .............................. 704/2; 704/8; 715/261; 715/264; 707/2; 707/3; 707/4; 707/5; 707/6; 455/556.2; 345/171

(58) Field of Classification Search .................. 704/2, 704/8; 715/261, 264; 455/556.2; 345/171
See application file for complete search history.

(56) References Cited

U.S. PATENT DOCUMENTS 3,980,869 A    9/1976  Lombardino et al.

4,286,329 A    8/1981  Goertzel et al.

(Continued)

FOREIGN PATENT DOCUMENTS

CN    1116335 A    2/1996

(Continued)

OTHER PUBLICATIONS

Arnott, J.L., et al; *Probabilistic Character Disambiguation for Reduced Keyboards Using Small Text Samples*; Dept. Math & Comp. Sci.; Univ of Dundee, Dundee, Tayside, Scotland; AAC Augmentative and Alternative Communication; vol. 8, Sep. 1992; Copyright 1992 by Isaac.

(Continued)

*Primary Examiner*—Patrick N Edouard
*Assistant Examiner*—Lamont M Spooner
(74) *Attorney, Agent, or Firm*—Michael A. Glenn; Glenn Patent Group

(57) ABSTRACT

The invention provides a process for selecting and ordering one or more sets of linguistic objects. The invention orders a current list of items for selection that comprises a first list of one or more items of a first language and a second list of one or more items of a second language, the current list of items being displayed in an order based on the first language having a priority over the second language. In response to a user selection of one item from the second list, the invention changes a priority for ordering a subsequent list of items to order the subsequent list of items based on the second language having a priority over the first language.

15 Claims, 4 Drawing Sheets

U.S. PATENT DOCUMENTS

| | | | |
|---|---|---|---|
| 4,365,235 A | 12/1982 | Greanias et al. | |
| 4,439,649 A | 3/1984 | Cecchi | |
| 4,454,592 A | 6/1984 | Cason et al. | |
| 4,559,598 A | 12/1985 | Goldwasser et al. | |
| 4,561,105 A | 12/1985 | Crane et al. | |
| 4,573,196 A | 2/1986 | Crane et al. | |
| 4,689,768 A | 8/1987 | Heard et al. | |
| 4,725,694 A | 2/1988 | Auer et al. | |
| 4,782,464 A | 11/1988 | Gray et al. | |
| 4,783,758 A | 11/1988 | Kucera | |
| 4,783,761 A | 11/1988 | Gray et al. | |
| 4,891,777 A | 1/1990 | Lapeyre | |
| 4,891,786 A | 1/1990 | Goldwasser | |
| 5,109,352 A | 4/1992 | O'Dell | |
| 5,127,055 A | 6/1992 | Larkey | |
| 5,187,480 A | 2/1993 | Thomas et al. | |
| 5,224,179 A | 6/1993 | Denker et al. | |
| 5,305,205 A * | 4/1994 | Weber et al. | 715/531 |
| 5,317,507 A | 5/1994 | Gallant | |
| 5,457,454 A | 10/1995 | Sugano | |
| 5,462,711 A | 10/1995 | Ricottone | |
| 5,533,147 A | 7/1996 | Arai et al. | |
| 5,561,446 A | 10/1996 | Montlick | |
| 5,574,482 A | 11/1996 | Niemeier | |
| 5,583,946 A | 12/1996 | Gourdol | |
| 5,586,198 A | 12/1996 | Lakritz | |
| 5,612,690 A | 3/1997 | Levy | |
| 5,649,223 A | 7/1997 | Freeman | |
| 5,664,896 A | 9/1997 | Blumberg | |
| 5,734,750 A | 3/1998 | Arai et al. | |
| 5,745,719 A | 4/1998 | Falcon | |
| 5,748,512 A | 5/1998 | Vargas | |
| 5,754,686 A | 5/1998 | Harada et al. | |
| 5,784,008 A | 7/1998 | Raguseo | |
| 5,796,867 A | 8/1998 | Chen et al. | |
| 5,798,760 A | 8/1998 | Vayda et al. | |
| 5,805,911 A * | 9/1998 | Miller | 715/534 |
| 5,812,696 A | 9/1998 | Arai et al. | |
| 5,812,697 A | 9/1998 | Sakai et al. | |
| 5,818,437 A | 10/1998 | Grover et al. | |
| 5,870,492 A | 2/1999 | Shimizu et al. | |
| 5,896,321 A * | 4/1999 | Miller et al. | 365/189.15 |
| 5,917,476 A | 6/1999 | Czerniecki | |
| 5,923,793 A | 7/1999 | Ikebata | |
| 5,926,566 A | 7/1999 | Wang et al. | |
| 5,928,588 A | 7/1999 | Chen et al. | |
| 5,933,526 A | 8/1999 | Sklarew | |
| 5,952,942 A | 9/1999 | Balakrishnan et al. | |
| 5,953,541 A | 9/1999 | King et al. | |
| 5,956,021 A | 9/1999 | Kubota et al. | |
| 5,963,671 A | 10/1999 | Comerford et al. | |
| 5,973,676 A | 10/1999 | Kawakura | |
| 6,002,390 A | 12/1999 | Masui | |
| 6,002,799 A | 12/1999 | Sklarew | |
| 6,009,444 A | 12/1999 | Chen | |
| 6,011,554 A | 1/2000 | King et al. | |
| 6,028,959 A | 2/2000 | Wang et al. | |
| 6,041,137 A | 3/2000 | Van Kleeck | |
| 6,044,165 A | 3/2000 | Perona et al. | |
| 6,054,941 A | 4/2000 | Chen | |
| 6,075,469 A | 6/2000 | Pong | |
| 6,094,197 A | 7/2000 | Buxton et al. | |
| 6,104,317 A | 8/2000 | Panagrossi | |
| 6,104,384 A | 8/2000 | Moon et al. | |
| 6,130,962 A | 10/2000 | Sakurai | |
| 6,144,764 A | 11/2000 | Yamakawa et al. | |
| 6,148,104 A | 11/2000 | Wang et al. | |
| 6,157,379 A | 12/2000 | Singh | |
| 6,169,538 B1 | 1/2001 | Nowlan et al. | |
| 6,172,625 B1 | 1/2001 | Jin et al. | |
| 6,204,848 B1 | 3/2001 | Nowlan et al. | |
| 6,212,297 B1 | 4/2001 | Sklarew | |
| 6,275,611 B1 | 8/2001 | Parthasaranthy | |
| 6,278,445 B1 | 8/2001 | Tanaka et al. | |
| 6,286,064 B1 | 9/2001 | King et al. | |
| 6,307,549 B1 * | 10/2001 | King et al. | 715/810 |
| 6,314,418 B1 * | 11/2001 | Namba | 707/2 |
| 6,320,943 B1 | 11/2001 | Borland | |
| 6,362,752 B1 | 3/2002 | Guo et al. | |
| 6,392,640 B1 | 5/2002 | Will | |
| 6,424,743 B1 | 7/2002 | Ebrahimi | |
| 6,437,709 B1 | 8/2002 | Hao | |
| 6,448,987 B1 | 9/2002 | Easty et al. | |
| 6,453,079 B1 | 9/2002 | McInerny | |
| 6,489,951 B1 | 12/2002 | Wong et al. | |
| 6,493,464 B1 | 12/2002 | Hawkins et al. | |
| 6,502,118 B1 | 12/2002 | Chatterjee | |
| 6,542,170 B1 * | 4/2003 | Williams et al. | 715/816 |
| 6,549,219 B2 | 4/2003 | Selker | |
| 6,567,072 B2 | 5/2003 | Watanabe | |
| 6,585,162 B2 | 7/2003 | Sandbach et al. | |
| 6,616,703 B1 | 9/2003 | Nakagawa | |
| 6,654,733 B1 | 11/2003 | Goodman et al. | |
| 6,686,852 B1 | 2/2004 | Guo | |
| 6,686,907 B2 | 2/2004 | Su et al. | |
| 6,711,290 B2 | 3/2004 | Sparr et al. | |
| 6,757,544 B2 | 6/2004 | Rangarajan et al. | |
| 6,765,554 B2 | 7/2004 | Millington | |
| 6,801,659 B1 | 10/2004 | O'Dell | |
| 6,807,529 B2 | 10/2004 | Johnson et al. | |
| 6,819,315 B2 | 11/2004 | Toepke et al. | |
| 6,820,075 B2 * | 11/2004 | Shanahan et al. | 707/3 |
| 6,829,607 B1 * | 12/2004 | Tafoya et al. | 707/6 |
| 6,864,809 B2 | 3/2005 | O'Dell et al. | |
| 6,912,581 B2 | 6/2005 | Johnson et al. | |
| 6,947,771 B2 | 9/2005 | Guo et al. | |
| 6,955,602 B2 | 10/2005 | Williams | |
| 6,956,968 B1 | 10/2005 | O'Dell et al. | |
| 6,970,599 B2 | 11/2005 | Longe et al. | |
| 6,973,332 B2 | 12/2005 | Mirkin et al. | |
| 6,982,658 B2 | 1/2006 | Rangarjan et al. | |
| 6,990,534 B2 | 1/2006 | Mikhailov et al. | |
| 7,020,270 B1 * | 3/2006 | Ghassabian | 379/368 |
| 7,020,849 B1 | 3/2006 | Chen | |
| 7,057,607 B2 | 6/2006 | Mayoraz et al. | |
| 7,075,520 B2 | 7/2006 | Williams | |
| 7,088,861 B2 | 8/2006 | Van Meurs | |
| 7,095,403 B2 | 8/2006 | Lyustin et al. | |
| 7,107,204 B1 * | 9/2006 | Liu et al. | 704/2 |
| 7,139,430 B2 | 11/2006 | Sparr et al. | |
| 7,149,550 B2 * | 12/2006 | Kraft et al. | 455/566 |
| 7,151,533 B2 | 12/2006 | Van Ieperen | |
| 7,155,683 B1 * | 12/2006 | Williams | 715/816 |
| 7,224,989 B2 * | 5/2007 | Kraft | 455/466 |
| 7,256,769 B2 | 8/2007 | Pun et al. | |
| 7,257,528 B1 | 8/2007 | Ritchie et al. | |
| 7,272,564 B2 | 9/2007 | Phillips et al. | |
| 7,313,277 B2 | 12/2007 | Morwing et al. | |
| 7,349,576 B2 | 3/2008 | Hotsberg | |
| 7,385,531 B2 * | 6/2008 | Zhang | 341/28 |
| 7,389,235 B2 | 6/2008 | Dvorak | |
| 7,437,001 B2 | 10/2008 | Morwing et al. | |
| 7,466,859 B2 | 12/2008 | Chang et al. | |
| 2001/0048425 A1 | 12/2001 | Partridge | |
| 2002/0093491 A1 | 7/2002 | Allen et al. | |
| 2002/0122072 A1 | 9/2002 | Selker | |
| 2002/0135499 A1 | 9/2002 | Guo | |
| 2002/0135561 A1 | 9/2002 | Rojewski | |
| 2002/0145587 A1 | 10/2002 | Watanabe | |
| 2002/0163544 A1 | 11/2002 | Baker et al. | |
| 2002/0168107 A1 | 11/2002 | Tang et al. | |
| 2003/0006956 A1 | 1/2003 | Wu et al. | |
| 2003/0023426 A1 | 1/2003 | Pun et al. | |
| 2003/0048257 A1 | 3/2003 | Mattila | |

| | | | |
|---|---|---|---|
| 2003/0054830 A1 | 3/2003 | Williams et al. | |
| 2003/0144830 A1 | 7/2003 | Williams | |
| 2003/0179930 A1 | 9/2003 | O'Dell et al. | |
| 2003/0184451 A1 | 10/2003 | Li | |
| 2004/0153963 A1 | 8/2004 | Simpson et al. | |
| 2004/0153975 A1 | 8/2004 | Williams et al. | |
| 2004/0163032 A1 | 8/2004 | Guo et al. | |
| 2004/0243389 A1 | 12/2004 | Thomas et al. | |
| 2005/0060138 A1* | 3/2005 | Wang et al. | 704/1 |
| 2005/0114770 A1 | 5/2005 | Sacher et al. | |
| 2005/0223308 A1* | 10/2005 | Gunn et al. | 715/500 |
| 2006/0062461 A1 | 3/2006 | Longe et al. | |
| 2006/0129928 A1 | 6/2006 | Qiu | |
| 2006/0136408 A1 | 6/2006 | Weir et al. | |
| 2006/0155536 A1 | 7/2006 | Williams et al. | |
| 2006/0158436 A1 | 7/2006 | LaPointe et al. | |
| 2006/0173807 A1 | 8/2006 | Weir et al. | |
| 2006/0190819 A1* | 8/2006 | Ostergaard et al. | 715/534 |
| 2006/0193519 A1 | 8/2006 | Sternby | |
| 2006/0236239 A1 | 10/2006 | Simpson et al. | |
| 2006/0239560 A1 | 10/2006 | Sternby | |
| 2006/0247915 A1* | 11/2006 | Bradford et al. | 704/1 |
| 2007/0094718 A1 | 4/2007 | Simpson | |
| 2007/0203879 A1 | 8/2007 | Templeton-Steadman et al. | |
| 2007/0276814 A1 | 11/2007 | Williams | |
| 2007/0285397 A1 | 12/2007 | LaPointe et al. | |
| 2008/0130996 A1 | 6/2008 | Sternby | |

FOREIGN PATENT DOCUMENTS

| | | |
|---|---|---|
| CN | 1190205 A | 8/1998 |
| CN | 1232204 A | 10/1999 |
| CN | 1358299 A | 7/2002 |
| CN | 1606753 | 4/2005 |
| DE | 3401942 | 11/1984 |
| EP | 0114250 | 11/1983 |
| EP | 0739521 | 5/1996 |
| EP | 0762265 | 3/1997 |
| EP | 0858023 | 8/1998 |
| EP | 0961208 | 12/1999 |
| EP | 1018679 | 12/1999 |
| EP | 1085401 | 3/2001 |
| EP | 1168780 | 1/2002 |
| EP | 1355225 | 10/2003 |
| FR | 2824979 | 11/2002 |
| JP | 57010832 | 1/1982 |
| JP | 62065136 | 3/1987 |
| JP | 1023021 | 1/1989 |
| JP | 1047565 | 2/1989 |
| JP | 1993081482 | 3/1993 |
| JP | 1999338858 | 12/1993 |
| JP | 1994083816 | 3/1994 |
| JP | 7094376 | 4/1995 |
| JP | 1995-146918 | 6/1995 |
| JP | 1996-305701 | 11/1996 |
| JP | 8319721 | 12/1996 |
| JP | 10135399 | 5/1998 |
| JP | 10-275046 | 10/1998 |
| JP | 11021274 | 1/1999 |
| JP | 11028406 | 2/1999 |
| JP | 2001043205 | 2/2001 |
| JP | 2001282778 | 10/2001 |
| JP | A 2003-500771 | 1/2003 |
| KR | 2001-0107388 | 12/2001 |
| KR | 20020004419 | 1/2002 |
| TW | 498264 B | 8/2002 |
| WO | WO98/16889 | 4/1998 |
| WO | WO 99/15952 | 4/1999 |
| WO | WO0072300 | 11/2000 |
| WO | WO 0074240 | 12/2000 |
| WO | WO03021788 | 3/2003 |
| WO | WO2004/111812 | 12/2004 |
| WO | WO 2004/111812 | 12/2004 |
| WO | WO2004/111871 | 12/2004 |
| WO | WO 2004/111871 | 12/2004 |
| WO | WO2006/026908 | 3/2006 |
| WO | WO 2006/026908 | 3/2006 |

OTHER PUBLICATIONS

Li, Xiaolin, et al; *On-line Handwritten Alphanumeric Character Recognition Using Feature Sequences*; Dept. Computer Sci; Hong Kong Univ of Sci and Tech; Clear Water Bay, Kowloon, Hong Kong.

Srihari, S.N., et al; *Cherry Blossom: A System for Japanese Character Recognition*; Center of Excellence for Document Analysis and Recognition; State University of New York at Buffalo, Buffalo, New York 14228.

Amin, A., et al.; *Recognition of Hand-printed Chinese Characters using Decision Trees/Machine Learning C4.5 System*[1]; School of Computer Sci and Engineering; Univ of New South Wales; 2052 Sydney, Australia; School of Computing; Univ of Plymouth PL4 8AA; UK; Pattern Analysis and Applications; vol. 1, issue 2, pp. 130-141, 1998.

Romero, R., et al; *Optical Chinese Character Recognition using Probabalistic Neural Networks*; Image Systems Lab; Robotics Institute; Carnegie Mellon University; Pittsburgh, PA 15213.

Seni, G. et al.; *Large Vocabulary Recognition of On-Line Handwritten Cursive Words*.

Vuurpijl, L. et al.; *Course writing-style clustering based on simple stroke-related features*[1]; NICL, Nijmegen Institute for Cognition and Information; University of Nijmegen; P.O. Box 9104, 6500 HE Nijmegen, The Netherlands.

Li, Xiaolin, et al; *On-line Handwritten Alphanumeric Character Recognition Using Feature Sequences*; Dept. Computer Sci; Hong Kong Univ of Sci and Tech; Clear Water Bay, Kowloon, Hong Kong, 1995.

Srihari, S.N., et al; *Cherry Blossom: A System for Japanese Character Recognition*; Center of Excellence for Document Analysis and Recognition; State University of New York at Buffalo, Buffalo, New York 14228, 1997.

Romero, R., et al; *Optical Chinese Character Recognition using Probabalistic Neural Networks*; Image Systems Lab; Robotics Institute; Carnegie Mellon University; Pittsburgh, PA 15213, 1997.

Seni, G. et al.; *Large Vocabulary Recognition of On-Line Handwritten Cursive Words*, 1996.

Vuurpijl, L. et al.; *Course writing-style clustering based on simple stroke-related features*[1]; NICL, Nijmegen Institute for Cognition and Information; University of Nijmegen; P.O. Box 9104, 6500 HE Nijmegen, The Netherlands, 1996.

Chen, Ju-Wei, et al., "A Hierarchical Representation for the Reference Database of On-Line Chinese Character Recognition," Aug. 20-23, 1996, INSPEC Abstract No. C9702-1250B-021.

Cheng, Rei-Heng, et al., "Recognition of Radicals in Handwritten Chinese Characters By Means of Problem Reduction and Knowledge Guidance," Sep. 1996, International Journal of Pattern Recognition and Artificial Intelligence, INSPEC Abstract No. C9706-5260B-280.

Chou, Kuo-Sen, et al., "Radical-Based Neighboring Segment Matching for On-Line Chinese Character Recognition," Aug. 25-26, 1996, Proceedings of the 13th International Conference on Pattern Recognition; INSPEC Abstract No. B9701-6140C-682, C9701-1250B-019.

Chou, Kuo-Sen, et al., "Radical-Based Neighboring Segment Matching for On-Line Chinese Character Recognition"; Apr. 1997, Computer Processing of Oriental Languages, INSPEC Abstract No. B9701-6140C-682, C9701-1250B-019.

Connell, S., et al., "Template-based Online Character Recognition"; Aug. 10, 1999; Department of Computer Science and Engineering, Michigan State University, East Lansing, Michigan.

Fan, Fang, et al., "An On-Line Handwritten Chinese Character Recognition System", Jan. 26-27, 2000, Proceedings of the SPIE—The International Society for Optical Engineering, INSPEC Abstract No. C2000-12-5260B-085.

Hung, Kwok-Wah, et al., "Boxing Code for Stroke-Order Free Handprinted Chinese Characters Recognition"; Oct. 8-11, 2000, Proceedings of IEEE International Conference on Systems, Man, Cybernetics, INSPEC Abstract No. C2001-01-5260B-087.

Kim, Ki-Cheol, et al., "On-Line Recognition of Stroke-Order Free Cursive Chinese Characters with Relaxation Matching", Mar. 1995; Journal of the Korea Information Science Society, INSPEC Abstract No. C9507-1250B-022.

Lin, Chang-Keng, et al., "Stroke-Order Independent On-Line of Handwritten Chinese Characters"; Nov. 8-10, 1989, Proceedings of the SPIE—The International Society for Optical Engineering, INSPEC Abstract No. C90031813.

Liu, J.Z., et al., "Two-layer Assignment Method for Online Chinese Character Recognition", Feb. 2000, IEEE Proceedings-Vision, Image and Signal Processing, INSPEC Abstract No. C2000-06-1250B-004.

Liu, Jianzhuang, et al., "Stroke Order and Stroke Number Free On-Line Chinese Character Recognition Using Attributed Relational Graph Matching", Aug. 25-29, 1996 Proceedings of the 13$^{th}$ International Conference on Pattern Recognition, INSPEC Abstract No. C9701-1250B-035.

Naito, S., et al., "Rough Classification for Handprinted Chinese Characters by Stroke Density"; Aug. 1981; Transactions of the Institute of Electronics and Communication Engineers of Japan, INSPEC Abstract No. C82009693.

Nambu, H., et al., "On-Line Chinese Handwriting Character Recognition: Comparison with Japanese Kanji Recognition and Improvement of Input Efficiency", Aug. 1999; Transactions of the Information Processing Society of Japan, INSPEC Abstract No. B2000-01-6135E-035, C2000-01-5260B-099.

Odaka, K., et al., "Stroke Order Free On-Line Handwritten Character Recognition of Algorithm", Jun. 1982, Transactions of the Institute of Electronics and Communication Engineers of Japan, Section E, INSPEC Abstract No. C82041007.

Pan, Bao-Chang, et al., "Recognition of Handprinted Chinese Characters by Stroke Order Codes", Aug. 29-Sep. 1, 1988, International Conference on Computer Processing of Chinese and Oriental Languages, INSPEC Abstract No. C89024386.

Park, Hee-Seon, et al., "An On-line Recognition System for Cursive Chinese Characters with Effective Coarse Classification and Elastic Matching", Sep. 1993, Journal of the Korea Information Science Society, INSPEC Abstract No. C9404-1250B-001.

Shin, J., "Online Handwriting Character Analysis Using Stroke Correspondence Search," Sep. 2001, Journal of Shanghai University, Aizu University, Fukushima, Japan, INSPEC Abstract No. C2001-11-1250B-012.

Stockton, R. et al., "JKanji: Wavelet-based Interactive Kanji Competition," Sep. 3-7, 2000, Proceedings of the 15$^{th}$ International Conference on Pattern Recognition.

"Quick Stroke Information," Synaptics, retrieved on Nov. 18, 2006 from website: www.synaptics.com/products/quickstroke_faq.cfm and www.synaptics.com/products/quickstroke.cfm.

Zheng, Jing, et al., "Recognizing On-Line Handwritten Chinese Character Via FARG Matching," Aug. 18-20, 1997, Proceedings of the Fourth International Conference on Document Analysis and Recognition, INSPEC Abstract No. B9711-6140C-162, C971-5260B-123.

Shumin Zhai and Per-Ola Kristensson, *Shorthand Writing on Stylus Keyboard*, Apr. 5-10, 2003, CHI 3003, 5(1): 97-104, 2003.

Jennifer Mankoff and Gregory D. Abowd, *Error Correction Techniques for Handwriting, Speech and other Ambiguous or Error Prone Systems*, Jun. 1999; GVU TechReport, GIT-GVU-99-18.

Jennifer Mankoff and Gregory D. Abowd, *Cirrin: A Word-Level Unistroke Keyboard for Pen Input*, Nov. 1-4, 1998; Proceedings of UIST 1998, Technical note. pp. 213-214.

K. Perlin, *Quikwriting: Continuous Stylus-Based Text Entry*; Nov. 1-4, 1998 presented at ACM UIST'98 Conference, pp. 215-216.

M. Garrett, D. Ward, I. Murray, P. Cowans, and D. Mackay, *Implementation of Dasher, an Information Efficient Input Mechanism*; Jul. 11, 2003; presented at LINUX 2003 Conference, Edinburgh, Scotland.

P. Isokoski and R. Raisamo, *Device Independent Text Input: A Rationale and an Example*; May 23-26, 2000;Proceedings of the Working Conference on Advanced Visual Interfaces AVI2000, pp. 76-83, Palermo, Italy, 2000.

P. Isokoski, *Text Input Methods for Eye Trackers Using Off-Screen Targets*; Nov. 6-8, 2000; In Proceedings of *Eye Tracking Research & Applications Symposium 2000*, pp. 15-21. ACM, 2000.

P. Isokoski, *Model for Unistroke Writing Time*; Mar. 31-Apr. 5, 2001; CHI Letters: Human Factors in Computing Systems, SIGCHI 2001, 3(1):357-364, 2001.

P. Isokoski and M. Käki. *Comparison of Two Touchpad-Based Methods for Numeric Entry*; Apr. 20-25, 2002; CHI Letters: Human Factors in Computing Systems, CHI 2002, 4(1): 25-32.

P. Isokoski and I. Scott MacKenzie, *Text Entry on Mobile Systems: Directions for the Future*; Mar. 31-Apr. 5, 2001;CHI 2001 Extended Abstracts, p. 495.

P. Isokoski and I. S. MacKenzie; *Report on the CHI2001 Workshop on Text Entry on Mobile Systems*; Sep./Oct. 2001; SIGCHI Bulletin, p. 14.

P. Isokoski and I. S. MacKenzie. *Combined Model for Text Entry Rate Developmen*; Apr. 5-10, 2003; CHI2003 Extended Abstracts, pp. 752-753.

P. Isokoski and R. Raisamo, *Architecture for Personal Text Entry Methods*; 2003; In *Closing the Gap: Software Engineering and Human-Computer Interaction*, pp. 1-8. IFIP.

*Handbook for the Palm V™ Organizer*; 1998-1999; Palm Computing, Inc., Santa Clara, CA.

Masui, T.; "An Efficient Text Input method for Pen-based Computers"; Apr. 1998; Proceedings of the ACM Conf. on Human Factors in Computing Systems (CHI'98), ACM Press, pp. 328-335.

Masui, T.; "POBox: An Efficient Text Input Method for Handheld and Ubiquitous Computers"; Apr. 1998; Sony Computer Science Laboratories.

Pilot POBox (1997/7); Printout form dated Jan. 30, 1920 from http://www.csl.sony.co.jp/person/maui/POBox/ilot.html; no translation provided.

POBox Example2: Printout form dated Jan. 30, 1920 from http://www.csl.sony..co.jp/person/masui/POBox/example2.html; no translation provided.

Softava Q12 Mobile's Keypad; Printout dated Oct. 24, 2006; http://www.softava.com/q12.

* cited by examiner

APPARATUS AND METHOD FOR REORDERING OF MULTIPLE LANGUAGE DATABASES FOR TEXT DISAMBIGUATION

CROSS REFERENCE TO RELATED APPLICATIONS

This application claims benefit of U.S. Provisional Patent Application Ser. No. 60/397,253, filed on Jul. 18, 2002 and is a continuation of U.S. patent application Ser. No. 10/621,864, filed on Jul. 16, 2003.

BACKGROUND OF THE INVENTION

1. Technical Field

The invention relates to text entry on electronic devices. More particularly, the invention relates to selection of desired languages amount multiple language databases on electronic devices.

2. Description of the Prior Art

Technological advances have enabled manufacturers to create various small-format personal electronic devices. Some examples are Personal Data Assistants (PDA), Cellular Phones, small-form-factor data entry units, and other small-form-factor communication units.

In many parts of the world, people regularly communicate in more than one language. Fluency in a native language plus English for business transactions, for instance, is common. Because SMS and e-mail is used regularly for messages between people and companies in different countries, a messaging application needs to support multiple languages. Two messages sent to two different people may use two different languages, and a single message may often mix words and phrases from two or more languages, for example, "I'll meet you at L'Arc de Triomphe at 1700."

Many mobile devices contain disambiguating and predictive text entry systems, primarily T9® Text Input, installed with multiple languages for the continent for which they are targeted. But few mobile device manufacturers make it easy or obvious to the user how to switch languages during text entry. If there is a text entry language setting that is separate from the display/menu language setting, it is often hidden deep in a menu structure.

It would be advantageous to provide a text entry system that provides the user the ability to simultaneously use two (or more) languages in a single text message or entry field, e.g. SMS, E-mail, Address Book entry without explicit language switching.

SUMMARY OF THE INVENTION

The invention provides a process for selecting and ordering one or more sets of linguistic objects. The invention orders a current list of items for selection that comprises a first list of one or more items of a first language and a second list of one or more items of a second language, the current list of items being displayed in an order based on the first language having a priority over the second language. In responses to a user selection of one item from the second list, the invention changes a priority for ordering a subsequent list of items to order the subsequent list of items based on the second language having a priority over the first language.

One preferred embodiment of the invention further receives a first plurality of keyboard inputs and determines the current list of items according to the first plurality of keyboard inputs.

One preferred embodiment of the invention further receives a second plurality of keyboard inputs and determines the subsequent list of items according to the second plurality of keyboard inputs, the subsequent list of items comprising a first plurality of items from the second language and a second plurality of items from the first language. The first list is displayed before the second list in displaying the current list of items; and the first plurality of items are displayed before the second plurality of items in displaying the subsequent list of items. A third list of items in the first language is displayed after the second list in displaying the current list of items and one or more items of the second language is displayed after the second plurality of items in displaying the subsequent list of items.

Each of the first list and the first plurality of items has up to a first predetermined number of items; and each of the second list and the second plurality of items has up to a second predetermined number of items. The first predetermined number is equal to the second predetermined number. Each of the current list of items for selection is a word determined according to the first plurality of keyboard inputs in one of a plurality of languages including the first and second languages. One or more of the first plurality of keyboard inputs is interpretable as being corresponding to more than one character in determine the current list of items for selection. Each of the first plurality of keyboard inputs is interpretable as being corresponding to a plurality of characters in determining the current list of items for selection. The plurality of languages consists of two languages. Which of the first and second languages has a higher priority in ordering a subsequent list is implicitly selected according to the language of the item selected from a current list.

One preferred embodiment of the invention provides a data processing system for displaying items to a user that includes means for ordering a current list of items for selection, the current list of items comprising a first number of first items of a first language and a second number of second items of a second language, the first items being ordered before the second items in the current list of items; and means for, after a user selection of one item of the second language from the current list of items, ordering a subsequent list of items for selection, the subsequent list of items comprising, for example, the first number of third items of the second language and the second number of fourth items of the first language, the third items being ordered before the fourth items in the subsequent list of items. The current list of items corresponds to a first plurality of inputs for a current word; and the subsequent list of items correspond to a second plurality of keyboard inputs for a subsequent word. Each of the first and second pluralities of inputs is interpretable as being corresponding to more than one character.

Other aspects and advantages of the invention will become apparent from the following detailed description in combination with the accompanying drawings, illustrating, by way of example, the principles of the invention.

DETAILED DESCRIPTION OF THE INVENTION

Figure 1:
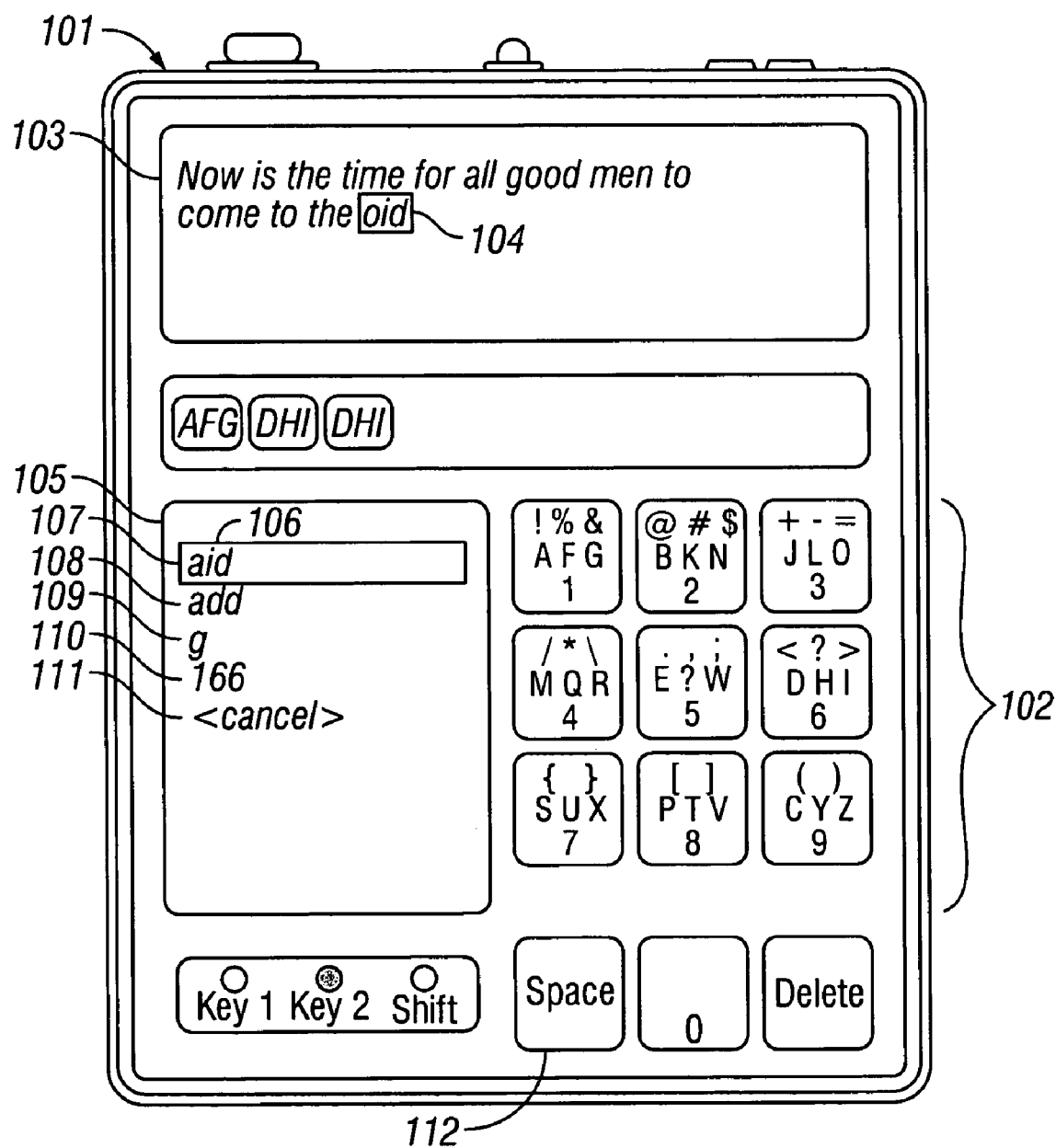
FIG. 1 is a diagram of a portable communication device with a reduced keyboard according to the invention.

Definitions:
Items: Linguistic objects including (but not limited to) words, partial or root words, word completions, phrases, abbreviations, "chat" slang, emoticons, user IDs, URLs, and/or ideographic character sequences, each of which may be composed of sub-word components including letters, syllables, strokes, radicals/components, jamos, kana, and/or punctuation symbols and digits.
Leading Language: The language that supplies first-tier ambiguous words.
Trailing Language: The language that supplies second-tier ambiguous words.
Principal Language: The language that supplies first-tier multi-tap letters and is the default leading language.
Supplemental Language: The language that supplies second-tier multi-tap letters.
AutoSwitch: Bilingual feature that auto-switches the leading and trailing languages if a trailing language word is used.
Build-around word: A word that contains a punctuation or explicit character that causes the word to be broken into a left-hand word and a right-hand word.

The invention provides a process for ordering the display of items to a user. The invention orders a current list of items for selection that comprises a first list of one or more items of a first language and a second list of one or more items of a second language, the current list of items being displayed in an order based on the first language having a priority over the second language. In responses to a user selection of one item from the second list, the invention changes a priority for ordering a subsequent list of items to order the subsequent list of items based on the second language having a priority over the first language.

One preferred embodiment of the invention further receives a first plurality of keyboard inputs and determines the current list of items according to the first plurality of keyboard inputs.

The bilingual feature of the present invention provides the user the ability to simultaneously use at least two languages in a single text message, e.g. SMS, E-mail, Address Book entry. It introduces the concept of principal and supplemental languages, leading and trailing languages, and leading and trailing candidate lists. Principal and supplemental languages may be implemented to support the configuration of bilingual mode (when using the menus to add supplemental languages) and in the presentation order of multi-tap characters.

Leading and trailing languages are concepts used to control the presentation order of bilingual candidates. In the preferred embodiment, the leading language will be the principal language, but it can be changed to the supplemental language if a supplemental item is selected and the AutoSwitch feature is turned on, or if the host operating system or application elects to change the default. Any change to the principal or supplemental language causes the Leading language to be reset to the principal language.

The AutoSwitch feature automatically switches the leading and trailing languages if an item from a trailing language is selected. The leading language candidate list comprises the list of candidates if only the leading language is available. In the preferred embodiment, the trailing language candidate list comprises the list of candidates if only the trailing language is available and no user-defined items or device-, context-, or application-specific items are allowed (the selection list can include reordered items). A user preference may be provided to allow the user to turn AutoSwitch on and off.

Referring to FIG. 1, a personal communications device 101 with a reduced keyboard is shown. Keyboard disambiguating systems such as described in U.S. Pat. Nos. 5,818,437, 5,953,541, 6,011,554, and 6,286,064 owned by the Applicant solve the text entry problem where input keys 102 are overloaded and a single key may represent several characters. User keystrokes on the keypad 102 are processed and displayed 103. While the user is pressing keys, the system predicts the words 106, 107, letters 108, numbers 109, or word stems (not shown) that the user is trying to enter. Complete words are dynamically displayed 105 to the user that begin with the letters represented by the key presses.

Presenting a list of items associated with the keys pressed allows the user to choose the intended item if more than one interpretation is possible. Also, including word completions on the list saves the user from entering additional keystrokes to spell an entire word and can reduce entry time. The user selects the first item in the list or scrolls down the list and selects the desired item. In this example, the user can press the space key 112 to accept the first item in the list. The selected item appears in the user's text entry position 104. The user can also continue to press keys to further narrow or refine the list of candidates until the desired item is displayed.

The invention's language database (LDB) contains items that are ordered according to a linguistics model that influences the order in which they are presented to a user. To save space storing the LDB, the LDB may be pre-ordered before placement into the product. The frequency values are not stored with the items in the database once it is compiled, thereby requiring less space to store the LDB.

Figure 2:
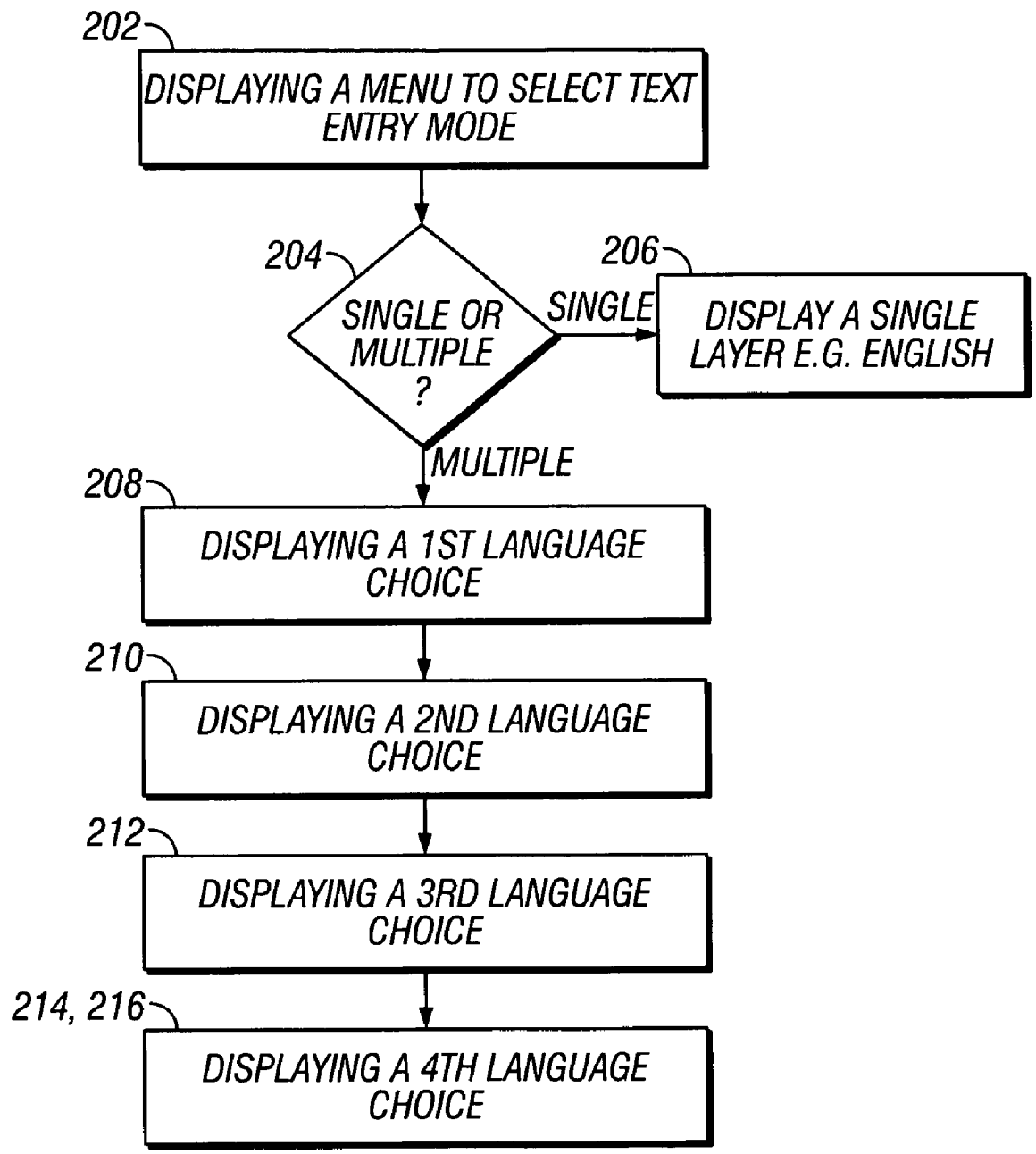
FIG. 2 is a flow diagram illustrating a process of selecting languages in text entry according to the invention.

FIG. 2 is a flow diagram illustrating a process of selecting languages in text entry according to a preferred embodiment of the invention. A user can choose "Languages" under the menu to initiate the choice of language mode. A user may choose to use single language, bilingual, or trilingual option 204. If a single language option is selected, a menu of language choices is displayed to allow a selection of a single language as the preferred text entry language 206. For example, English is selected as the preferred language of choice for text entry.

If a multiple language option is selected, a menu of first language choices is displayed to allow a selection of the first language as the principal text entry language 208. For example, English may be selected as the first language.

Subsequently, a menu of second language choices is displayed to allow a selection of the second language as the supplemental text entry language 210. For example, French may be selected as the second language of choice for text entry. This process may continue for users who may wish to choose a third or even a fourth language as language of choice 212, 214, 216 etc.

Figure 3A:
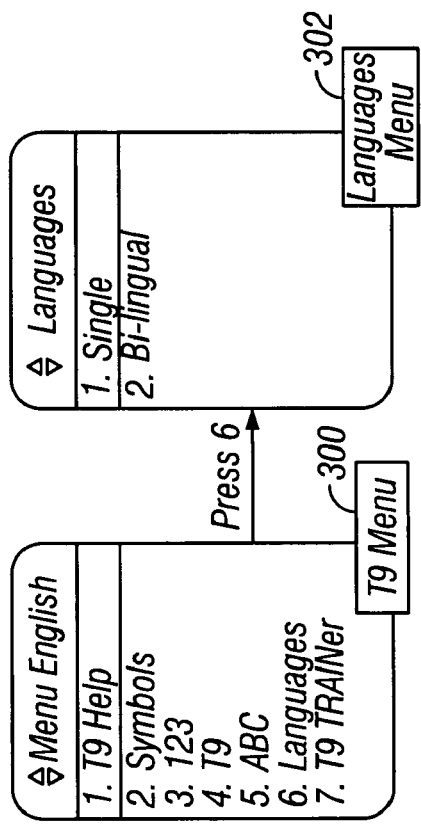
FIG. 3A-3C show an example of a process of selecting languages for text entry according to the invention.
Figure 3B:
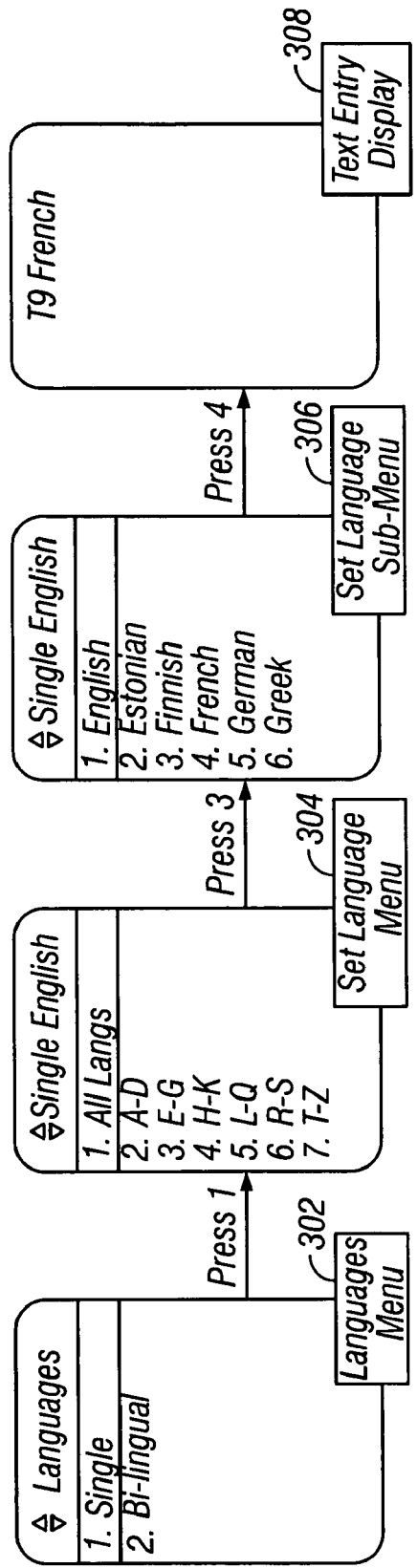
Figure 3C:
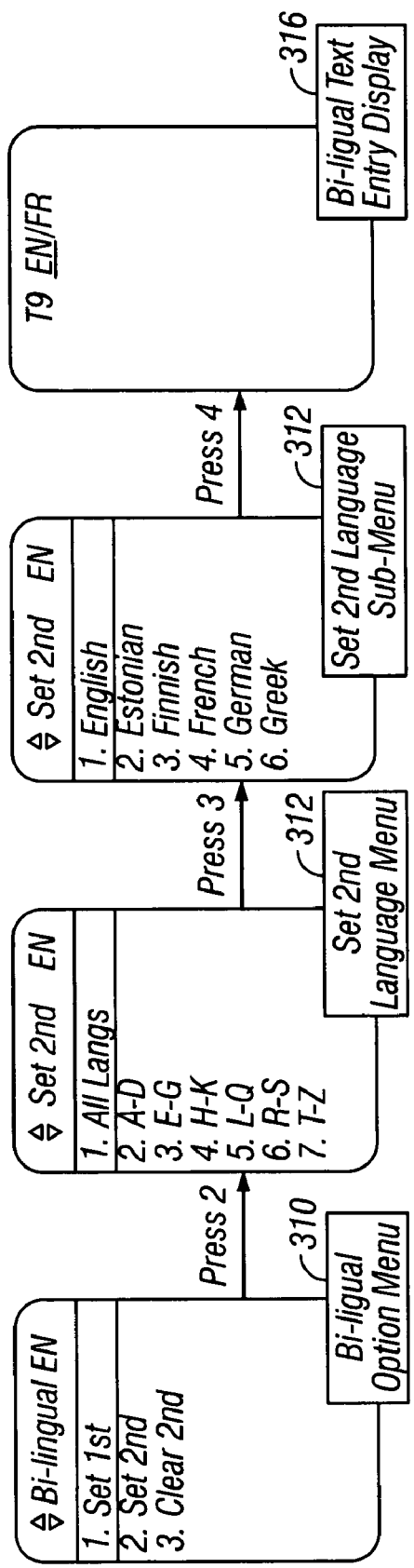

FIGS. 3A-C illustrate option menus that can be displayed on an electronic device according to an embodiment of the invention that supports two languages. A user may select a "Languages" menu item from a menu 300, to initiate the display of the languages menu 302.

Selecting the "Single" menu item from the languages menu 302 initiates the display of the single language menu 304. If the system is currently set in bilingual mode, then pressing the "Single" menu item (and selecting a language) clears the selection of the second language and sets the system to single-language mode.

FIG. 3B shows an example of a process of selecting languages. For example, a user desires to change the text entry language, which is currently English. Selecting any item from the single language menu 304 initiates the display of a single language sub-menu 306. Selecting any item from a single language sub-menu 306 may return the user to the text entry display 308. When the text entry display is shown, the principal language will reflect the user's choice from single the language sub-menu 306. In this case, "French" was selected.

FIG. 3C shows an example of selecting a second language as a supplemental text entry language. For example, a user has English as the preferred or principal language and wants to add French as the second language. The user selects the "Bilingual" menu item from the languages menu 302 which initiates the display of the bi-lingual option menu 310. Selecting the "Set 2nd" item initiates a set second language menu 312. Selecting an item from the set second language menu 312 initiates a set second language sub-menu 314. Selecting an item from a set language sub-menu 314 may return the user directly to the bilingual text entry display 316.

When the user returns to the text entry display 308 or 316, candidates from the chosen language or languages will be included in the list of candidates.

If two languages are chosen, the selected languages may be indicated in the status line using the associated two-letter language abbreviations separated by a slash mark (/), as in 316; otherwise the full language name may be displayed, as in 308. If two languages are selected, the leading language is indicated by underlining the name or associated two-letter abbreviation in the status line.

A user may later choose the "Clear 2nd" menu item on the bi-lingual option menu 310 to return the system to a single language candidate list.

In the preferred embodiment, the default order and presentation of bilingual candidates are as follows. First, predetermined number of items from the leading language candidate list, to the extent that they exist. The default number of words is two. This first group of items may also include device-, context-, or application-specific items and user-defined items associated with either language.

Second, a predetermined number of items from the trailing language candidate list, to the extent that they exist. The default number of items is two. This group does not include device-, context-, or application-specific items or user-defined items.

Third, the remaining items from the leading language candidate list, to the extent that they exist, including any additional specific and user-defined items, but excluding word completions. They are followed by the remaining items from the trailing language candidate list to the extent that they exist, but also excluding word completions.

Finally, leading and trailing language word completions are presented, in that order, after the items specified above.

In accordance with other aspects of the invention, the language of a build-around word is the language of the word on the right-hand side (RHS). Duplicate items are suppressed after positions have been allocated to each language. Reordering of items due to frequency or recency of use is language-specific, only impacting the order of items within a given principal and supplemental language.

For words with embedded punctuation or embedded explicit characters the order rules of the second half of the word may be as follows: If AutoSwitch is on, the order rules of the second half of the word match those of the language of the first half of the word; If AutoSwitch is off, the order rules of the second half of the word match those of the current principal language. When breaking, if there is a French Rule language and there is a match to the language then that match takes precedence when flushing. For words with trailing punctuation the language of the word is that of the selected word and not the language the punctuation came from, e.g. the language of "housesċ" is English.

All appropriate terminal punctuation endings from both languages should be available in the word candidate list. The terminal punctuation endings may be ordered as follows:

Terminal punctuation endings from the language of the word on the left-hand side;

Terminal punctuation endings from the remaining language, suppressing for duplicates.

For example, if one of the available languages uses the French rule for punctuation, then the French punctuation rule is available when composing an input sequence. The terminal punctuation sequences from all languages are available. By default, the embedded punctuation comes from the current or applicable language. If an explicit punctuation symbol is set, that symbol overrides the default language embedded punctuation.

Figure 4:
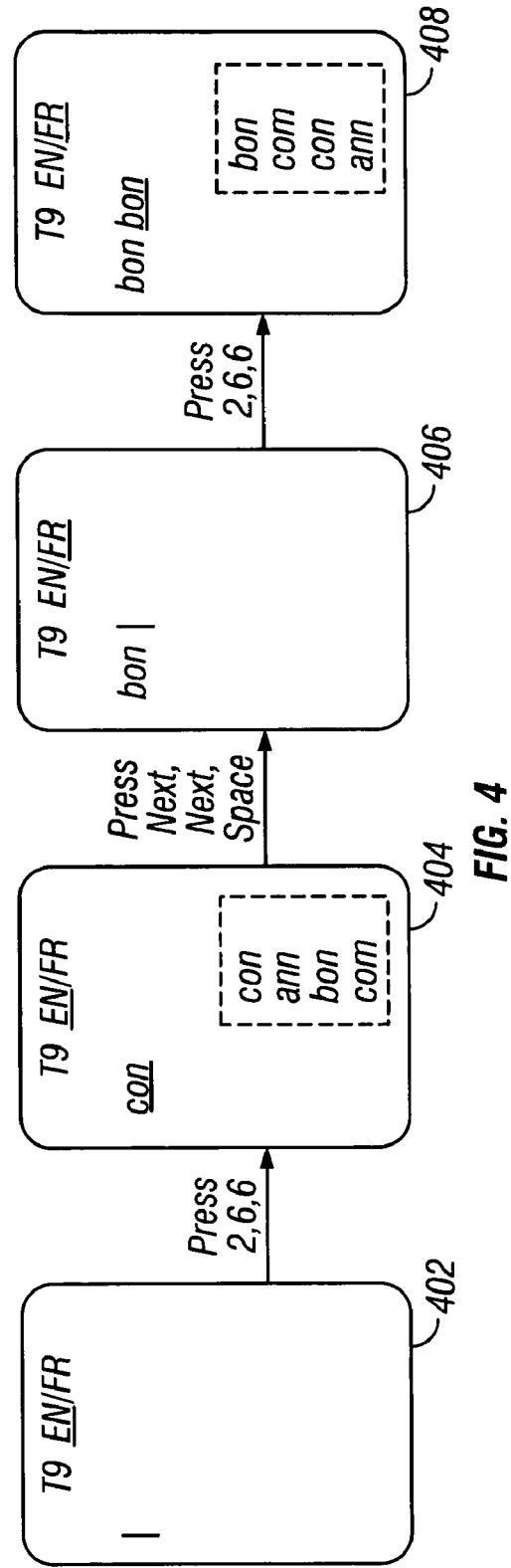
FIG. 4 is shows an example of automatic switching of languages according to the invention.

FIG. 4 shows an example of automatic switching from one language to another according to the invention. The text entry field 402 displays both languages of English and French as the choices of languages, English being the principal and leading language and French being the supplemental and trailing language.

If AutoSwitch is on, when a user selects an item from the trailing language, the trailing language becomes the leading language, and the formerly leading language becomes the trailing language. In this example, the selection of the French word "bon" instead of one the English words "con" or "ann", in 404, makes the previous trailing language French the leading language, such that typing the same sequence, as in 408, now lists "bon" and "com" ahead of "con" and "ann". The language indicator changes to indicate the switch into a new leading language, though the principal and supplemental language choices remain unchanged.

In the preferred embodiment, the configuration of more than one language also affects explicit character input.

The multi-tap assignments to each key include entries from all selected languages. In a multi-tap mode, the presentation of single characters is as follows:

Device-specific ordering of characters from the principal language;

Device-specific ordering of characters from the supplemental language.

Duplicates are suppressed. Using multi-tap mode does not change the principal language. This behavior supports the user's confidence in memorizing their multi-tap sequence, so they can use multi-tap without visual cues, no matter which language is currently leading.

In conditions where a language is selected for bilingual entry that uses a two-key matrix entry method, the matrix entry mode is always reserved for the matrix entry language regardless of whether it is the leading or trailing language.

Although the invention is described herein with reference to the preferred embodiment, one skilled in the art will readily appreciate that other applications may be substituted for those set forth herein without departing from the spirit and scope of the present invention. In particular, the concept can be extended to address more than two languages. Accordingly, the invention should only be limited by the Claims included below.

The invention claimed is:

1. A process for displaying items to a user, comprising the steps of:

ordering a current list of items for selection, the current list of items comprising a first list of one or more items of a first language and a second list of one or more items of a second language, the current list of items being displayed in an order based on the first language having a priority over the second language; and responsive to a user selection of one item from the second list, changing a priority for ordering a subsequent list of items to order the subsequent list of items based on the second language having a priority over the first language.

2. The process of claim 1, further comprising the steps of:
receiving a first plurality of keyboard inputs; and
determining the current list of items according to the first plurality of keyboard inputs.

3. The process of claim 2, further comprising the steps of:
receiving a second plurality of keyboard inputs; and
determining the subsequent list of items according to the second plurality of keyboard inputs, the subsequent list of items comprising a first plurality of items from the second language and a second plurality of items from the first language.

4. The process of claim 3, wherein the first list is displayed before the second list in displaying the current list of items; and the first plurality of items is displayed before the second plurality of items in displaying the subsequent list of items.

5. The process of claim 4, wherein a third list of items in the first language is displayed after the second list in displaying the current list of items; and one or more items of the second language is displayed after the second plurality of items in displaying the subsequent list of items.

6. The process of claim 4, wherein each of the first list and the first plurality of items is allowed up to a first predetermined number of items; and each of the second list and the second plurality of items is allowed up to a second predetermined number of items.

7. The process of claim 6, wherein the first predetermined number is equal to the second predetermined number.

8. The process of claim 2, wherein each of the current items for selection is a linguistic object determined according to the first plurality of keyboard inputs in one of a plurality of languages including the first and second languages.

9. The process of claim 8, wherein one or more of the first plurality of keyboard inputs is interpretable as being corresponding to more than one character in determining the current list of items for selection.

10. The process of claim 8, wherein each of the first plurality of keyboard inputs is interpretable as being corresponding to a plurality of characters in determine the current list of items for selection.

11. The process of claim 8, wherein the plurality of languages consist of two languages.

12. The process of claim 1, wherein which of the first and second languages has a higher priority in ordering a subsequent list is implicitly selected according to a language of the item selected from a current list.

13. A data processing system for displaying items to a user, comprising:
means for ordering a current list of items for selection, the current list of items comprising a first number of first items of a first language and a second number of second items of a second language, the first items being ordered before the second items in the current list of items; and
means for, after a user selection of one item of the second language from the current list of items, ordering a subsequent list of items for selection, the subsequent list of items comprising the first number of third items of the second language and the second number of fourth items of the first language, the third items being ordered before the fourth items in the subsequent list of items.

14. The data processing system of claim 13, wherein the current list of items correspond to a first plurality of inputs for a current word; and the subsequent list of items correspond to a second plurality of keyboard inputs for a subsequent word.

15. The data processing system of claim 14, wherein each of the first and second pluralities of inputs is interpretable as being corresponding to more than one characters.

* * * * *